United States Patent [19]
Tokushima

[11] Patent Number: 5,715,901
[45] Date of Patent: Feb. 10, 1998

[54] REDUCTION GEARSET FOR ELECTRIC VEHICLE

[75] Inventor: Shoji Tokushima, Saitama-ken, Japan

[73] Assignee: Honda Giken Kogyo Kabushiki Kaisha, Tokyo, Japan

[21] Appl. No.: 633,945

[22] Filed: Apr. 17, 1996

[30] Foreign Application Priority Data

Apr. 19, 1995 [JP] Japan ..................... 7-093727

[51] Int. Cl.⁶ ................................. B60K 17/02
[52] U.S. Cl. ........................... 180/65.6; 475/178
[58] Field of Search .................. 180/65.5, 65.6, 180/248, 249; 475/169, 172, 175, 153, 178

[56] References Cited

U.S. PATENT DOCUMENTS

| | | | |
|---|---|---|---|
| 4,799,564 | 1/1989 | Iijima et al. | 180/65.6 |
| 5,038,884 | 8/1991 | Hamada et al. | 180/248 X |
| 5,116,291 | 5/1992 | Toyosumi et al. | 180/65.6 X |
| 5,513,719 | 5/1996 | Moroto et al. | 180/65.4 |
| 5,643,129 | 7/1997 | Richardson | 180/248 X |

*Primary Examiner*—Josie Ballato
*Attorney, Agent, or Firm*—Nikaido, Marmelstein, Murray & Oram LLP

[57] ABSTRACT

A reduction gearset for use on an electric vehicle having a motor. The reduction gearset has an input shaft, a reduction mechanism equipped with an input pinion, and a selector device for connecting the input shaft to, or disconnecting the input shaft from, the input pinion. The motor power is transmitted to the input shaft. The input pinion is rotatable relative to the input shaft. The selector device consists of a sleeve spline fit to both input shaft and input pinion. The sleeve can slide axially of the input shaft. A slidable shift shaft is mounted parallel to the input shaft. A shift fork is fixedly mounted to the shift shaft. The sleeve is made to engage the shift fork. The sleeve is moved forward or rearward by moving the shift shaft forward or rearward. Thus, the input pinion is coupled to, or uncoupled from, the input shaft.

12 Claims, 3 Drawing Sheets

REDUCTION GEARSET FOR ELECTRIC VEHICLE

BACKGROUND OF THE INVENTION

1. Field of the Invention

The present invention relates generally to a reduction gearset mounted on an electric vehicle which is driven by an electric motor and, more particularly, to a reduction gearset which permits simplification of the structure of the motor control portion of an electric vehicle.

2. Description of the Related Art

In an electric vehicle, a motor control portion is mounted between a battery and an electric motor. Generally, the motor is driven or regenerative braking action is produced under control of the motor control portion to control the vehicle speed. Therefore, the reduction gearset, which is placed in the power train spanning from the motor to the drive wheels, couples the wheels to the motor at a given reduction ratio.

As the vehicle thus arranged is forced to run, for example, by towing, the motor is rotated by rotation of the wheels coupled to the motor via the reduction gearset. As a result, a counter electromotive force produced in the motor by rotation thereof is applied to the motor control portion. To avoid the generation of a high counter electromotive power upon rotation of the motor at high speed, the rated withstand voltage of the motor control portion needs to be set at a high value. This will lead to an increase in the costs of the components typified by the motor control portion.

SUMMARY OF THE INVENTION

It is therefore an object of the present invention to provide a reduction gearset for use on an electric vehicle, which prevents the generation of a counter electromotive force in the motor by rotation of the wheels and thus permits use of cheaper components in the motor control portion and other portions.

The present invention lies in a reduction gearset for use on an electric vehicle, which includes a selector means capable of coupling the rotational force from the motor to, or uncoupling the force from, the reduction gearset.

That is, in the novel reduction gearset for an electric vehicle, if necessary, the power train between the input shaft and the output shafts can be engaged or disengaged. When the power train is engaged, the motor can drive the wheels. When the power train is disengaged, the wheels are uncoupled from the motor.

More specifically, the reduction gearset has an input pinion which is mounted so as to be rotatable relative to the input shaft. The selector means is positioned between the input shaft and the input pinion. Thus, the torque applied to the selector means is made smaller than that applied to the countershaft. Therefore, the rotational force from the motor can be transmitted to the wheels through the simple selector means capable of transmitting small torques.

Since the generation of a counter electromotive power due to rotation of the wheels can be suppressed by interrupting the power train, it becomes unnecessary for the rated withstand voltages of the electronic components to be set at high values. Consequently, the motor control portion can be constructed at low cost. Further, since braking torque from the motor can be suppressed by interrupting the power train by means of the selector means, the traction load can be alleviated.

In one specific form of the invention, the selector means is equipped with a locking mechanism for keeping the selector means engaged. Therefore, the selector means is kept engaged unless the locking mechanism is unlocked, thus achieving the connection between the input shaft and the reduction gearset. Consequently, undesired situations can be avoided without adversely affecting the normal operation of the vehicle.

The aforementioned countershaft has a parking gear for inhibiting and permitting rotation of the countershaft. When the vehicle is parked, the parking gear locks the countershaft and inhibits rotation of the wheels, whether the selector means is engaged or disengaged.

BRIEF DESCRIPTION OF THE DRAWINGS

Preferred embodiments of the present invention will hereinafter be described in detail with reference to the accompanying drawings, in which.

DETAILED DESCRIPTION OF THE PREFERRED EMBODIMENTS

Figure 1:
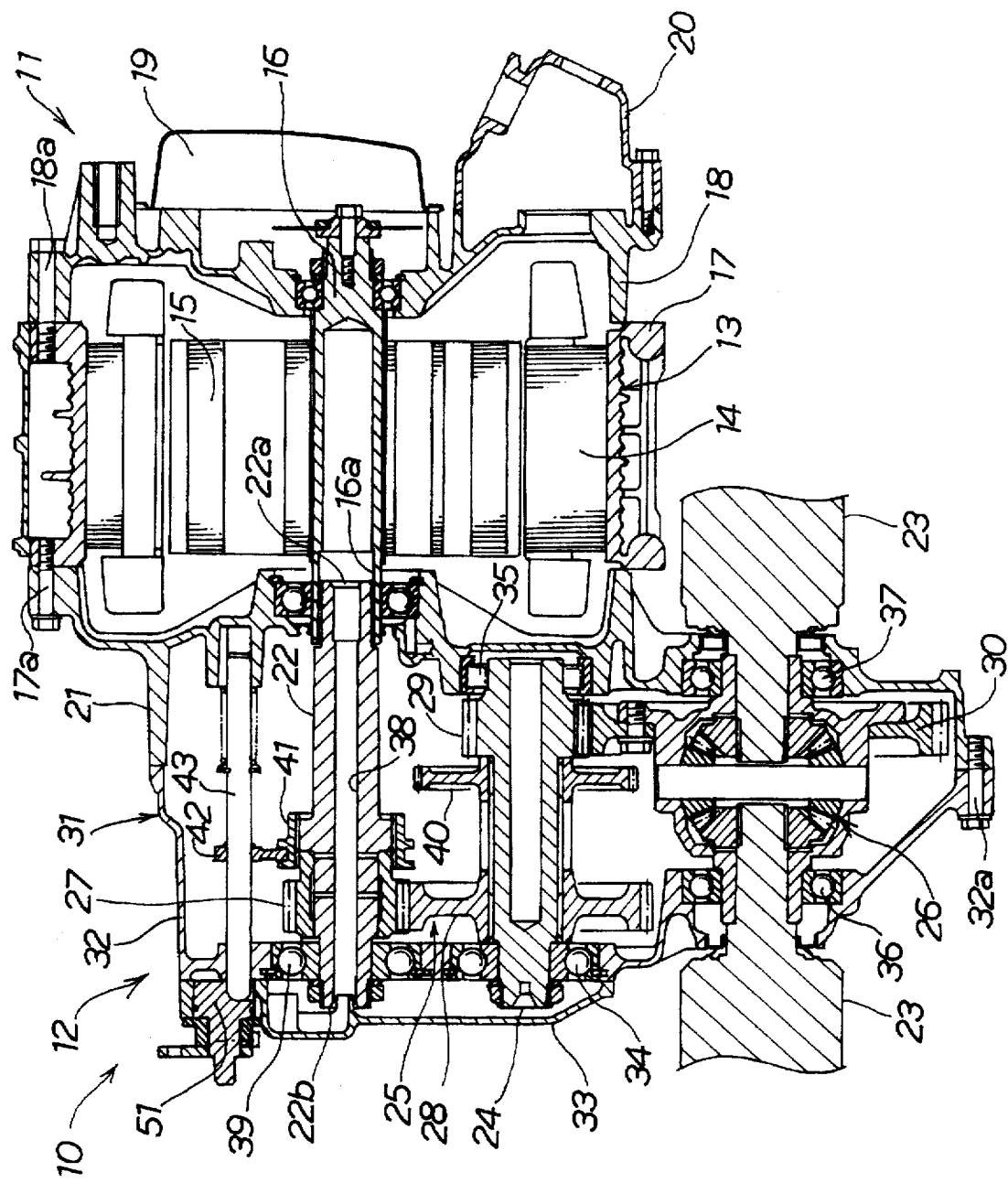
FIG. 1 is a cross-sectional view of a power train including a reduction gearset according to the invention, the reduction gearset being for use on an electric vehicle.

Referring to FIG. 1, a power train mounted on an electric vehicle is generally indicated by reference numeral 10. This power train 10 has a motor 11 for driving the vehicle and a reduction gearset 12 according to the invention.

The motor 11 has a motor housing 13, a stator 14 disposed inside the housing 13, a rotor 15 disposed inside the stator 14, and a motor shaft 16 mounted in the center of the rotor 15.

The body of the motor housing 13 is indicated by numeral 17. A motor cover 18 is fixedly mounted to the rear end of the housing body 17 by bolts 18a. A bearing cover 19 and a terminal cover 20 are mounted to the motor cover 18. A first gear housing 21 is firmly mounted to the front end of the housing body 17 by bolts 17a.

The aforementioned reduction gearset 12 comprises an input shaft 22 connected to the motor shaft 16 of the motor 11, two opposite output shafts 23 parallel to the input shaft 22, a reduction mechanism 25 for transmitting power flow from the input shaft 22 to the output shafts 23 via a countershaft 24 at a reduction gear ratio, and a differential gearset 26. The output shafts 23 are connected to drive wheels (not shown).

The reduction mechanism 25 comprises an input pinion 27 rotatably mounted to the input shaft 22, a large reduction gear 28 in mesh with the input pinion 27 and mounted to one end of the countershaft 24, an output pinion 29 formed integrally with the other end of the countershaft 24, and a large final gear 30 meshing with the output pinion 29. The differential gearset 26 transmits the power flow to the two opposite wheels via the output shafts 23 while making up the difference in speed between the final gear 30 and the two opposite wheels.

In the present example, the reduction gearset 12 has no transmission providing different gear ratios. The gear ratio of the reduction gearset 12 is fixed.

A gear housing 31 houses the input shaft 22, the countershaft 24, and the differential gearset 26. The gear housing 31 comprises the above-described first gear housing 21, a second gear housing 32 fixed by bolts 32a to cover the opening in the first gear housing 21, and a gear cover 33 for covering the front end of the second gear housing 32. Bearings 34 and 35 support both ends of the countershaft 24. Bearings 36 and 37 support both ends of the differential gearset 26.

The input shaft 22 has a cavity 38 which forms a lubricating oil path. One end 22a of the input shaft 22 is fitted in the cavity 16a inside the motor shaft 16 and spline fit to it, while the other end 22b is rotatably held to the second gear housing 32 via a bearing 39. A parking gear 40 is mounted to the countershaft 24 and engages with a locking member (not shown) to inhibit rotation of the countershaft 24.

Figure 2:
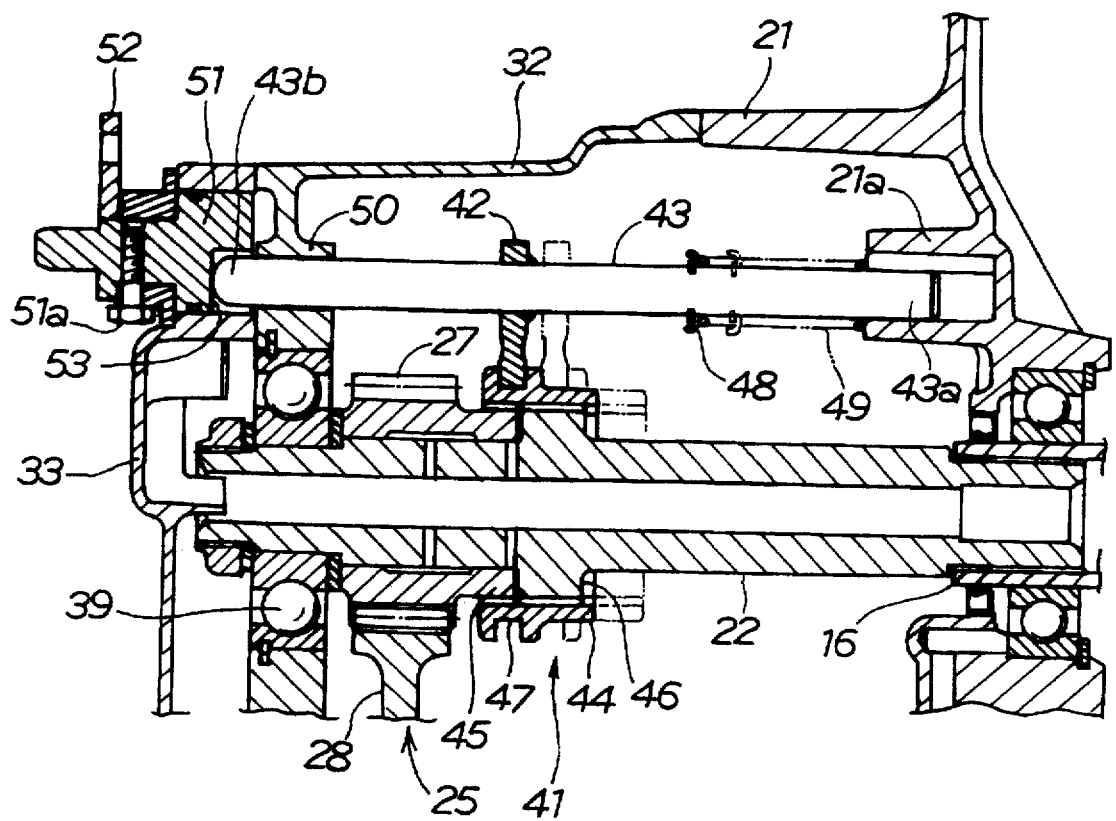
FIG. 2 is a cross-sectional view of main portions of the reduction gearset shown in FIG. 1.

FIG. 2 shows main portions of the reduction gearset 12 of the present example. The input pinion 27 of the reduction mechanism 25 is rotatably held to the outer periphery of the input shaft 22 by a slipping bearing. A selector means 41 is mounted between the input shaft 22 and the input pinion 27 to connect the input shaft 22 to, or disconnect it from, the input pinion 27. A shift shaft 43 extends parallel to the input shaft 22 and is slidable along the axis of the input shaft 22. A shift fork 42 forming a control portion for switching the selector means 41 is firmly mounted to the shift shaft 43.

The selector means 41 is composed of a sleeve 44 capable of sliding axially of the input shaft 22 and the input pinion 27. The input shaft 22 has an enlarged portion 46 having the same diameter as the diameter of an end 45 of the input pinion 27. The enlarged portion 46 and the pinion end 45 are each provided with plural protrusions. The sleeve 44 is internally provided with keyways in which these protrusions can be fitted. Thus, the end 45 of the pinion, the enlarged portion 46, and the sleeve 44 are spline fit together. Circumferential grooves 47 are formed in the outer surface of the sleeve 44. The shift fork 42 of the shift shaft 43 is engaged in the circumferential grooves 47.

The sleeve 44 spline fit to the pinion end 45 and to the enlarged portion 46 as described above transmits rotating force of the motor shaft 16 from the input shaft 22 to the input pinion 27. Since this transmitted torque is smaller than the torque on the side of the countershaft 24 which is multiplied by the reduction gear 28, the simple selector means 41 permits motor action to be applied to the drive wheels.

The aforementioned shift shaft 43 has a base portion 43a slidably supported to a support portion 21a of the first gear housing 21. The shift shaft 43 further includes a front end portion 43b slidably held to a sliding support portion 50 formed in the second gear housing 32. A spring sheet 48 is mounted over the shift shaft 43. A compression coil spring 49 is located between the spring sheet 48 and the support portion 21a. The resilient force of the coil spring 49 always biases the shift shaft 43 toward the front end portion 43b, or forward. The biasing force of the spring 49 causes the sleeve 44 to be spline fit to both input shaft 22 and input pinion 27, the sleeve 44 being connected to the shift shaft 43 via the shift fork 42 firmly mounted to the shift shaft 43.

The front end portion 43b of the shift shaft 43 is made to protrude outwardly of the sliding support portion 50 by the biasing force of the spring 49. A shift drum 51 is rotatably mounted to the top of the gear cover 33 so as to bear against the protruding front end portion 43b. A lock bolt 51a forms a locking mechanism. The shift drum 51 has a rotating lever 52 for rotating the shift drum 51. The lever 52 is so positioned that it moves the axis of rotation of the shift drum 51 upwardly away from the axis of the shift shaft 43 and that the axis of rotation of the drum 51 is parallel to the axis of the shift shaft 43. A control wire (not shown) or the like is connected to the rotating lever 52.

Figure 3:
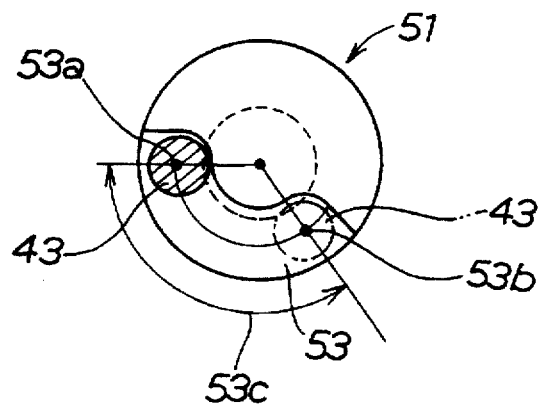
FIG. 3 is a plan view of main portions of the shift drum shown in FIGS. 1 and 2.

FIG. 3 is a side elevation of main portions of the shift drum 51. The curved surface of this drum 51 forms a cam surface 53 which can assume two positions 53a and 53b. In the illustrated example, these two positions 53a and 53b are angularly spaced about 130° from each other. The intervening portion is a continuous inclined portion 53c. Referring back to FIG. 2, in the position 53a, the selector means 41 is engaged, and the sleeve 44 is spline fit to both input shaft 22 and input pinion 27. In the position 53b, the sleeve 44 is disconnected from the input pinion 27. The aforementioned lock bolt 51a is used to lock the shift drum 51 in the connection position 53a.

The reduction gearset constructed as described thus far operates in the manner described below.

The shift shaft 43 is biased toward the shift drum 51 by the compression coil spring 49. The shift drum 51 is turned by rotating the rotating lever 52. The shift shaft 43 is moved rearward toward the support portion 21a of the first gear housing 21 against the resilient force of the spring 49 by the inclined portion 53c of the cam surface 53 of the shift drum 51. That is, when the shift drum 51 is located in the connection position 53a, the sleeve 44 is spline fit to both input shaft 22 and input pinion 27 via the shift fork 42. The input pinion 27 is kept connected with the input shaft 22. When the shift drum 51 is located in the disconnection position 53b, the shift fork 42 is retracted together with the shift shaft 43, as indicated by the phantom line in FIG. 2. Therefore, the sleeve 44 is disconnected from the input pinion 27, thus disconnecting the input pinion 27 from the input shaft 22. That is, the selector means 41 is switched by rotating the shift drum 51 so as to select either the position 53a or 53b.

Accordingly, under normal conditions when the running operation of the vehicle is controlled by the motor, it becomes possible, by placing the shift drum 51 in the connection position 53a, to transmit the motor action to the wheels and to cause the driving force or braking force produced by the motor to act upon the wheels. By rotating the shift drum 51 to the disconnection position 53b with the lock bolt 51a pulled out, it also becomes possible to disconnect the input pinion 27 from the input shaft 22. Thus, since the generation of the counter electromotive force in the motor by the action of the wheels can be suppressed, it becomes unnecessary to set the rated withstand voltages of the electronic components at high values. It also becomes possible to construct the motor control portion at low cost. Further, since the braking torque is suppressed by the disengagement of the selector means, the traction load can be reduced.

Figure 4:
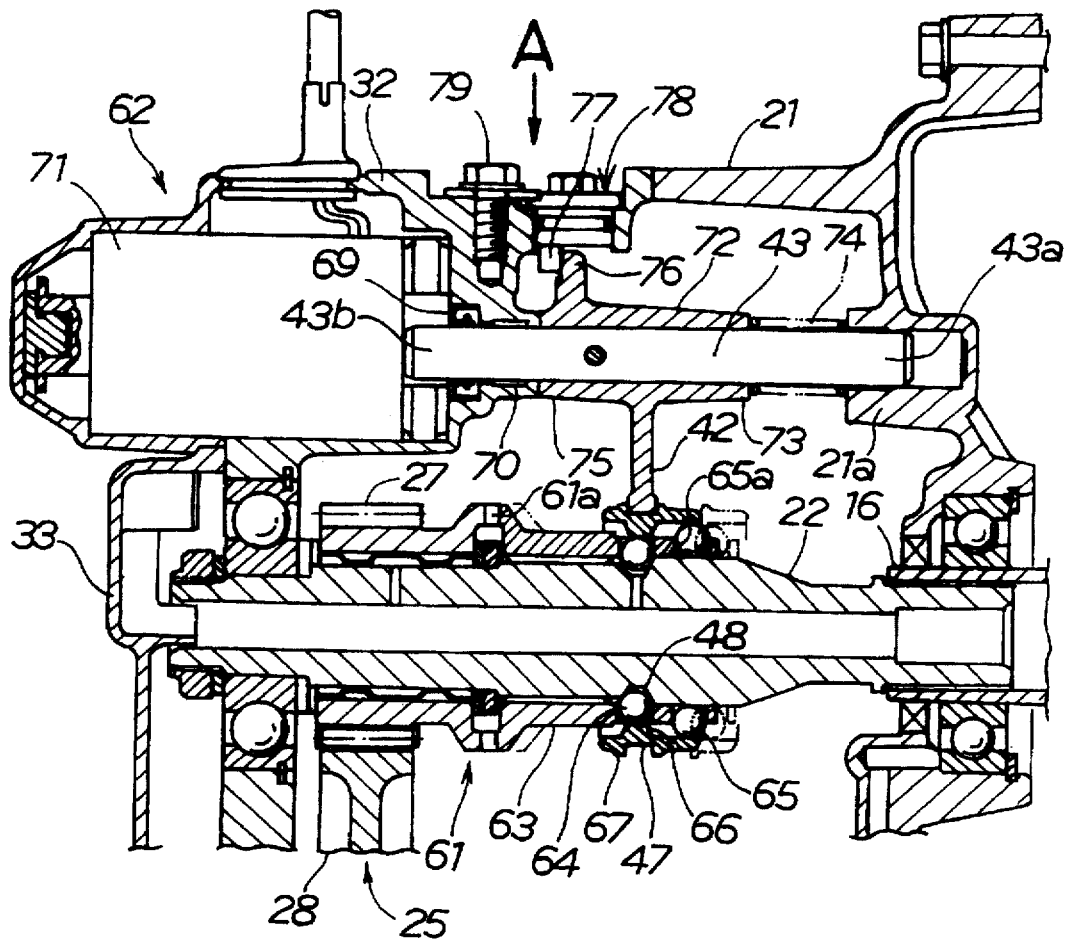
FIG. 4 is a cross-sectional view of a power train including another reduction gearset according to the invention, the reduction gearset being for use on an electric vehicle.

FIG. 4 shows another reduction gearset according to the present invention, the reduction gearset being mounted on an electric vehicle. It is to be noted that like components are indicated by like reference numerals and that those components which have been already described will not be described below.

The input pinion 27 of the aforementioned reduction mechanism 25 is rotatably held to the outer surface of the input shaft 22 by a needle bearing. A claw clutch 61 forming the above-described selector means is mounted between the input pinion 27 and the input shaft 22 to connect the input pinion 27 to, or disconnect it from, the input shaft 22. The claw clutch 61 has dog teeth 61a. The shift shaft 43 for engagement or disengagement of the claw clutch 61 is equipped with a sliding operation portion 62 for sliding operation.

The claw clutch 61 is formed by the end of the input pinion 27 and a hub 63. The hub 63 which is movable is slidably spline fit to the input shaft 22. The hub 63 is provided with guide holes 64a and 65a for holding a lock ball 64 and a guide ball 65 in such a way that these balls can roll relative to the input shaft 22. A sleeve 67 for holding down the outer surfaces of the lock ball 64 and of the guide ball 65 is mounted on the outer surface of the hub 63 so as to be movable axially of the input shaft 22. A ridge 66 is formed on the inner surface of the sleeve 67 and engages the lock ball 64 and the guide ball 65 to permit the hub 63 to be slid. When the sleeve 67 is slid forward or rearward, the hub 63 is slid forward or rearward via the lock ball 64 or the guide ball 65. The claw clutch 61 connects or disconnects the hub 63 to or from the input pinion 27.

A peripheral groove 68 is formed in the input shaft 22 to place the lock ball 64 in position. The peripheral groove 68 is used to place the lock ball 64 in position when the claw clutch 61 is engaged. When the lock ball 64 is placed in position by the peripheral groove 68, the ridge 66 on the sleeve 67 engages the outer surface of the locking ball 64. At this time, radial movement of the lock ball 64 is inhibited, and the lock ball 64 acts as a stopper that locks the hub 63 and keeps the claw clutch 61 engaged.

The shift shaft 43 has its front end portion 43b protruding from a sliding support portion 70 provided with an oil seal 69. A solenoid 71 capable of assuming two positions is mounted on the side of the front end portion 43b of the shift shaft 43. The solenoid 71 consists of an actuator for forward or rearward movement. The front end portion 43b bears against the solenoid 71. The shift fork 42 has a hub 72 which is affixed to an intermediate portion of the shift shaft 43 by a pin 72a. A compression coil spring 74 is located between one end 73 of the hub 72 and the support portion 21a of the first gear housing 2. The base portion 43a of the shift shaft 43 is slidably held by the support portion 21a of the shift shaft 43. The claw clutch 61 is engaged in the position where the other end 75 of the hub 72 bears against the end of the sliding support portion 70.

The above-described shift fork 42 is brought into the engagement position of the claw clutch 61 by the resilient force of the compression coil spring 74. The solenoid 71 moves the shift shaft 43 rearward against the resilient force of the spring 74 to disengage the claw clutch 61 via the shift fork 42.

The hub 72 of the shift fork 42 has an engaging protrusion 76. A shift cam 78 has an eccentric pin 77 engaging the engaging protrusion 76. The shift cam 78 is rotatably held in a countersunk hole formed in the second gear housing 32. The shift cam 78 is provided with a stopper 79 to prevent the shift cam 78 from rotating.

Figure 5:
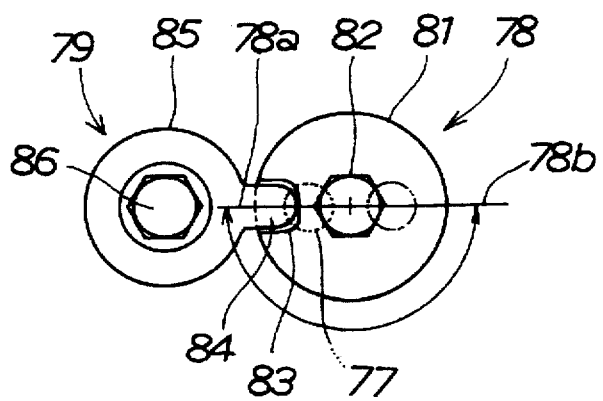
FIG. 5 is a plan view taken in the direction indicated by the arrow A in FIG. 4.

FIG. 5 is a view taken in the direction indicated by the arrow A in FIG. 4. The shift cam 78 has a law 81 by which the second gear housing 32 shown in FIG. 4 is rotatably held. A hexagonal head 82 for permitting an operation for making a rotation and a notch 83 are formed in the top surface of the jaw 81. The notch 83 acts to determine the angular position of the shift cam 78. The stopper 79 which constitutes a locking mechanism is formed by a lock plate 85 and a bolt 86 that locks the lock plate 85. The lock plate 85 has a protruding portion 84 fitted in the notch 83.

When the shift cam 78 is rotated, the eccentric pin 77 of the shift cam 78 is brought into engagement with the engaging protrusion 76. The positional relation of the shift fork is determined via the engaging protrusion 76. The shift cam 78 can be made to take two positions 78a and 78b which are spaced 180° from each other by rotating the shift cam 78. The angular spacing between these two positions 78a and 78b corresponds to the maximum stroke of the shift shaft 43. Forward or rearward movement of the sleeve 67 engaging the shift fork makes either the position 78a or 78b correspond to the connection position or the disconnection position of the claw clutch 61, respectively.

The shift cam 78 can be rotated by loosening the bolt 86, bringing the protruding portion 84 of the lock plate 85 out of the notch 83 in the shift cam 78 so as to permit rotation of the shift cam 78, and rotating the hexagonal head 82 with a wrench or the like. The operation of the reduction gearset constructed in this way is next described by referring to FIGS. 4 and 5.

When the solenoid 71 is in its retracted position, the resilient force of the spring 74 engages the claw clutch 61 via the shift fork 42 of the shift shaft 43 and also via the sleeve 67 engaging the shift fork 42. At this time, the outer surface of the ridge 66 on the sleeve 67 locks the lock ball 64 positioned in the peripheral groove 68 in the input shaft 22, thus locking the hub 63 of the claw clutch 61 engaging with the lock ball 64.

When the solenoid 71 is in its advanced position, the shift shaft 43 is caused to slide rearward against the resilient force of the spring 74. This causes the shift fork 42 to slide the sleeve 67 rearward, thus disengaging the ridge 66 on the sleeve 67 from the lock ball 64. The hub 63 of the claw clutch 61 is slid rearward via the guide ball 65. This brings the hub 63 out of engagement with the rear end of the input pinion 27. As a result, the claw clutch 61 is disengaged.

When the solenoid 71 is not in operation, the hexagonal head 82 is rotated with a wrench or the like. That is, the shift cam 78 is rotated manually to switch the position of the cam 78 between the positions 78a and 78b. In this way, the claw clutch 61 is engaged or disengaged.

As described thus far, the novel reduction gearset is equipped with the selector means for coupling rotating force from an electric motor to, or uncoupling the force from, a reduction mechanism. It is to be understood that the selector means is not limited to the constructions of the above examples.

What is claimed is:

1. A reduction gearset for use on an electric vehicle having an electric motor for driving the vehicle, drive wheels, and a power train having an input shaft for receiving rotating output power from said motor, a reduction mechanism for lowering rotational speed of said input shaft, and a countershaft for transmitting rotating output power from said reduction mechanism to said driving wheels, said reduction gearset comprising:

an input pinion provided in said reduction mechanism and being rotatable with respect to said input shaft; and a selector means for coupling said input pinion to, or uncoupling said input pinion from, said input shaft.

2. A reduction gearset according to claim 1, wherein there is further provided a shift shaft for operating said selector means, and wherein said shift shaft is slidable parallel to said input shaft.

3. A reduction gearset according to claim 2, wherein there is further provided a shift fork located between said shift shaft and said selector means and fixedly mounted to said shift shaft, and wherein said shift fork engages or disengages said selector means in response to sliding movement of said shift shaft.

4. A reduction gearset according to claim 2 or 3, wherein a shift drum is mounted on a front end side of said shift shaft to cause said shift shaft to slide.

5. A reduction gearset according to claim 4, wherein said shift drum has a cam surface, and wherein said shift shaft is caused to slide via said cam surface by rotating said shift drum.

6. A reduction gearset according to claim 5, wherein there is further provided a lock mechanism to prevent said shift drum from rotating and to keep said selector means engaged.

7. A reduction gearset according to claim 1, 2, or 3, wherein said selector means is spline fit to both said input shaft and said input pinion and has an axially slidable sleeve.

8. A reduction gearset according to claim 2 or 3, wherein a solenoid is mounted around a front end of said shift shaft to cause said shift shaft to slide.

9. A reduction gearset according to claim 3, wherein said shift fork has a hub provided with a protrusion, a shift cam having an eccentric pin engaging said protrusion is mounted above a front end of said shift shaft, and said shift shaft is caused to slide by rotation of said shift cam.

10. A reduction gearset according to claim 9, wherein there is further provided a lock mechanism to prevent said shift drum from rotating and to keep said selector means engaged.

11. A reduction gearset according to claim 1, wherein said countershaft is provided with a parking gear for inhibiting or permitting rotation of said countershaft.

12. A reduction gearset according to claim 1, 2, or 3, wherein said selector means comprises a hub spline fit to said input shaft and a claw clutch engaging with said input pinion.

* * * * *